Oct. 17, 1939.  G. G. FLOYD  2,176,865
PRESSURE COOKER
Filed Oct. 21, 1936  2 Sheets-Sheet 1
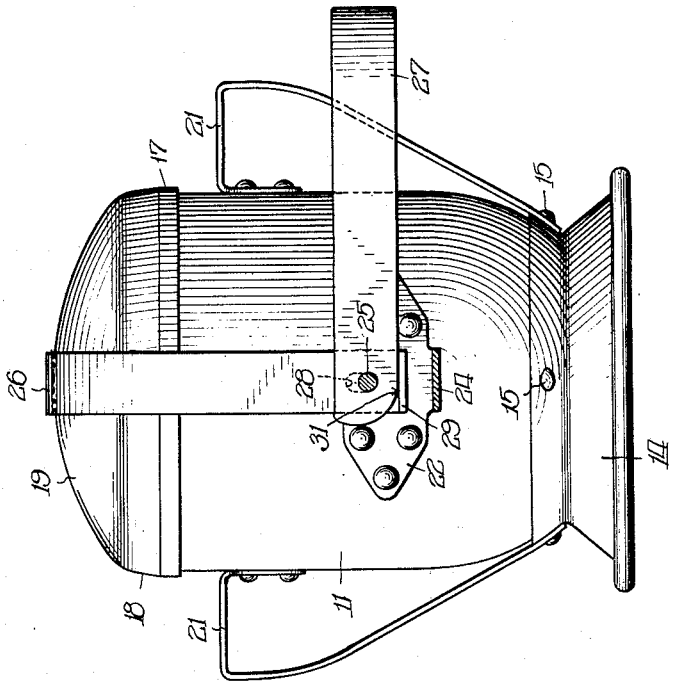
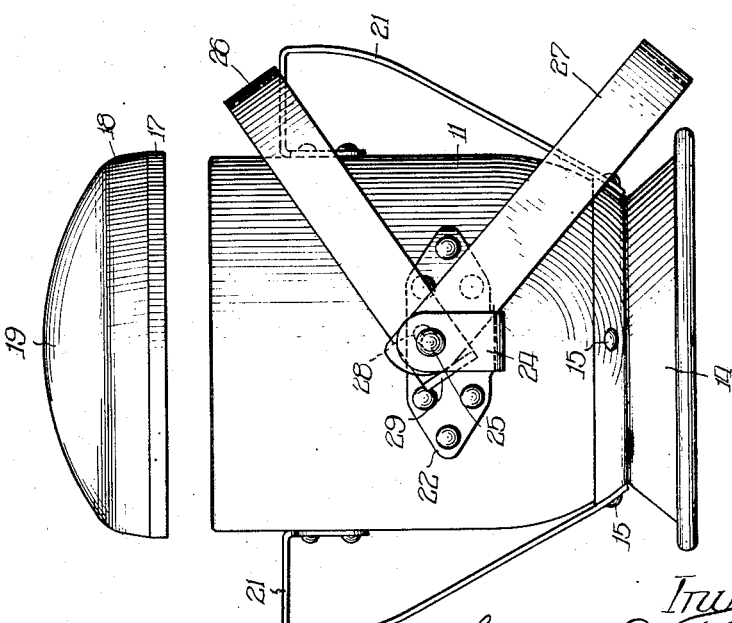
Inventor:
George G. Floyd
By Walter M. Fuller atty Oct. 17, 1939.  G. G. FLOYD  2,176,865
PRESSURE COOKER
Filed Oct. 21, 1936  2 Sheets-Sheet 2
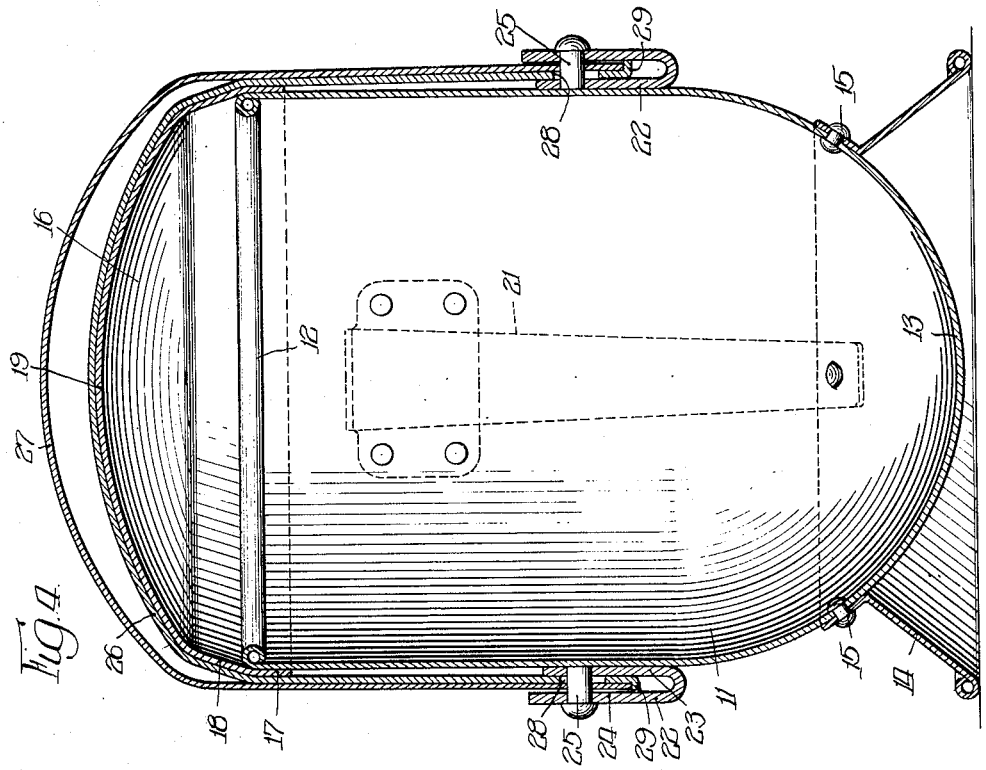
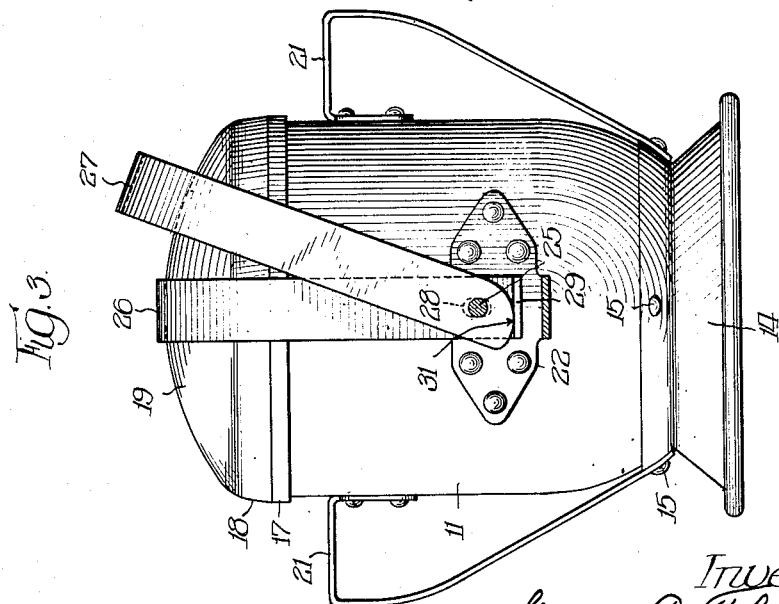
Inventor:
George G. Floyd
By Walter M. Fuller Atty.

Patented Oct. 17, 1939

2,176,865

UNITED STATES PATENT OFFICE 2,176,865

PRESSURE COOKER

George G. Floyd, Chicago, Ill.; Union Trust Company, Greensburg, Ind., executor of said George G. Floyd, deceased Application October 21, 1936, Serial No. 106,814

11 Claims. (Cl. 220—55)

Present-day steam-pressure cookers are for the most part made of aluminum castings which are more expensive and have less strength value per pound than aluminum which has been rolled into sheets, and, accordingly, one of the main objects of the present invention is to so design a pressure-cooker that it may be fashioned from rolled aluminum sheets thereby reducing the expense of production and the weight of the structure.

The cost of a cast aluminum pressure-cooker is such that ordinarily it is only economical to market such an appliance in comparatively large sizes, the smallest of which is rather large for a small family, or, in case there is only one vegetable or other edible material to be cooked, and, consequently, an aim of this invention is to develop a type or design of pressure-cooker that can be manufactured and sold successfully in a small size for cooking a single article of food or for use by a family of a few members.

A further aim of the invention is to provide a family steam-pressure cooker that is light in total weight and therefore easily handled.

Another purpose of the invention is to supply a mechanism for opening and closing the pressure-chamber of the cooker which has but few parts capable of being quickly and easily operated.

Obviously, a pressure-cooker must be susceptible of being opened to permit it to receive the vegetables or other articles of food to be cooked, and in turn its opening must be closed so that a suitable steam-pressure may be generated within the appliance, and it is evident that the closure must be steam-tight.

Within the range of the steam-pressures and the corresponding steam-temperatures employed in the usual home pressure-cooker, the coefficient of thermal expansion of aluminum is slightly more than twice that of steel, and one aim of this invention is to make use of this difference in thermal expansion of the two metals under heat to form a steam-tight connection or joint between the vessel containing the food or vegetables and its closure plate or cover.

Various other features of benefit and advantage incident to the employment of the present invention will become apparent from a consideration and understanding of the present preferred embodiment thereof illustrated in detail in the accompanying drawings, throughout the several views of which like reference numerals have been employed to designate the same parts.

In these drawings:

Figure 1 shows the improved pressure-cooker in open condition;

Figure 2 is a similar view showing the closure or cover in place with one bail over it;

Figure 3 is an analogous view partly broken away to indicate the function and purpose of the second bail; and Figure 4 is a vertical, central cross-section through the cooker including its two bails and on an enlarged scale.

Referring to these drawings, it will be noted that the new and improved pressure-cooker includes a vessel, chamber or pressure-pot 11 designed to hold the vegetables or other articles of food to be cooked or steamed under pressure, this receptacle being round in cross-section as shown, having an open top with the upper edges of the side walls turned or rolled inwardly to form an internal marginal bead 12 provided for the purpose of increasing the peripheral strength around the opening, and having a hemi-spherical bottom 13, this vessel being drawn or formed from a thin, flat sheet of rolled aluminum.

To provide vertical stability, a round ring-base 14, also made of a thin sheet of rolled aluminum, is riveted at 15, 15 to the lower portion of the vessel, such base affording convenient and simple means for supporting the structure in upright position.

The open upper end or mouth of vessel 11 is adapted to be covered and closed by a dish-shaped cover or closure, characterized as a whole 16, formed of a thin rolled sheet of steel.

As is illustrated most clearly in Figure 4, which depicts a cross-section of such cover member, it will be observed that the lower edge portion thereof comprises a short, cylindrical or vertical flange 17 adapted to fit over or around the upper portion of vessel 11, and immediately above such flange the wall of the cover leans inwardly with a straight taper at 18, of say one to four, and merges into the top wall 19 which is dished or concaved with a relatively large radius, all as is fully shown.

The inside diameter of such cover flange 17 is slightly greater than the external diameter of the cooking vessel 11, whereby in seating the cover plate over the upper open end of the vessel 11, the marginal beaded edge 12 will bear or wedge against the inside surface of the tapered wall 18.

For convenience in handling the appliance, it is desirably equipped with a pair of opposite, suitable-shaped handles 21, 21 riveted in approved manner to the vessel 11, all as is clearly shown in Figures 1, 2 and 3.

A bail, pivot-pin bracket 22 is riveted to each of the opposite sides of the pressure-pot 11 and is located as far down from the open top end or mouth of the vessel as is feasible, each such bracket having a main portion 23 bearing against the outer face of the member 11 and an upwardly-extended section 24 spaced outwardly therefrom, as is fully disclosed in Figure 4, a suitable pivot or hinge-pin 25 occupying aligned holes in each of such brackets and bridging the space between its two separated parts.

The mechanism for clamping the cover or closure 16 over the upper open end or mouth of the pressure-pot 11 consists of two bails 26 and 27 which may be aptly characterized as an inside bail 26 and an outside bail 27, or designated as a clamping-bail 26 and a cam-lever or power-bail 27, these two bails being formed of strips of flat, rolled steel of a width substantially greater than their thickness.

The middle portion of the inner clamping-bail 26 is formed to the same contour as the outside surface of the central portion of the cover 16 as presented in Figure 4, and the two, parallel, straight, lower, legs of such bail are provided with slots 28, 28 accommodating the hinge or pivot pins 25, 25, the extreme lower ends of such legs of the bail being turned outwardly at right-angles to the planes of such ends to form short gibs 29, 29.

The outer power or cam-lever bail 27 is formed of the same general contour as the inner bail 26 and the legs of this bail are somewhat longer than the corresponding parts of the bail 26, so that, when the two bails are brought together or into register in the same vertical plane, there will be a material space between them, as shown in Figure 4, the lower portions of the ends of this lever bail 27 being provided with round pivot-pin holes receiving the pins 25, 25, whereby such bail may rock on the pins, the extreme ends of the legs of such outer bail being formed as cams 31, 31 overlying and co-acting with the gibs 29, 29 of the inner bail, by which means rocking of the outer bail pulls or forces the inner bail down onto the cover with greater firmness, this movement of the inner bail being possible by reason of the fact that the pivot-pins 25, 25 are in slots 28, 28 of the legs of bail 26.

The cooker, of course, is equipped with the usual steam-pressure gauge and a safety control-valve, neither of which has been shown as they are well understood in the art, and the cooker is designed to carry a working steam-pressure of about fifteen pounds gauge-pressure.

To secure a minimum in material weight and cost, the bottom or closed end 13 of the pressure pot or vessel 11 is drawn to a perfect half sphere, as shown in Figure 4, with the radius of the sphere equal to one-half of the diameter of the main portion of the vessel, this construction being substantially different from the ordinary aluminum cookers of today on the market, which, so far as is known, have flat bottoms.

As the side-walls of the shell 11 need not be as thick as the bottom to carry the same steam-pressure, in forming the pressure-pot 11 from a single sheet of rolled aluminum, the required thickness of the bottom determines the thickness of the rolled sheet from which the pot is to be drawn.

According to the mathematical formula for calculating the required thickness of the bottom head or wall for the same steam-pressure, a flat-bottom pot would require a thickness five times that needed for the hemi-spherical-bottom pot, and, therefore, the entire sheet of material from which the flat-bottom pot would be drawn, were it made of sheet-metal, would be five times as thick as the sheet of material from which a spherical-bottom pot of the same strength could be drawn, and, accordingly, the finished pot with a hemi-spherical bottom will weigh only about one-fifth that of a flat-bottom pot of the same capacity, and, therefore, as the ultimate cost is closely proportioned to the weight of material employed, the hemi-spherical-bottom pot shows great economy over a flat-bottom pot.

Figure 1 illustrates the improved cooker open to receive a charge of vegetables or other edibles to be cooked, with the two bails 26, 27 rocked to one side in released position and the cover or closure 16 removed.

To close the cooker, the cover 16 is positioned centrally over the top open end or mouth of the pressure-pot 11, with its marginal flange enclosing the upper part of the vessel wall, whereupon the inner clamping-bell 26 is raised or rocked to a vertical position centrally with reference to the cover as presented in Figure 2, after which the cam-lever or power-bail 27 is rocked upwardly as indicated in Figure 3.

By this movement, the cams 31, 31 on bail 27 bearing on the gibs 29, 29 of the inner bail 26 produce a downward vertical movement or pull on bail 26, the slots 28 in the lower ends of the clamping-bail legs allowing the necessary movement.

Such downward movement of bail 26 under the action of the cams produces a corresponding downward movement of the cover 16 toward the mouth or upper end of the pressure-pot 11, thereby clamping the cover 16 firmly thereto in proper place.

The loop length of bail 27 is longer than that of bail 26, so that in case the two bails should match up vertically as a result of wear between the gibs and cams, there would be a clearance between the central loop sections of the two bails in order that a convenient finger grip may be had for raising or lowering the outer power or cam-lever bail 27.

As has been indicated above, the pressure-pot 11 is made of aluminum and the cover 16 and the two bails 26 and 27 are made of steel, the aluminum at or below the steam temperatures involved in the usual home pressure-cooker expanding slightly more than two times as much as steel.

It is the general practice to use fifteen pounds steam gauge pressure in home pressure-cookers, the steam at such pressure having a temperature of approximately 250° Fahrenheit, and, as the cooker as a whole quickly heats up to this temperature, the aluminum pot expands twice as much as the steel parts.

Using this difference in the thermal expansion of aluminum and steel, by designing, shaping and relating the members in the manner specified, there has been produced a steam pressure-cooker made in part of aluminum and in part of steel in which the closure is made steam-tight by the difference in the thermal expansion of the two metals, and, in the operation of closing the cooker, it is only necessary to employ a relatively light pressure, just sufficient to bring the parts into positive contact and to maintain them in proper position and alignment.

The clamping-bail 26 being centrally located over and in contact with the cover-plate 16, a slight downward movement of the bail causes the bead 12 of the pressure-pot to contact around its entire periphery with the inclined, inner surface of the portion 18 of the cover, the bail 26 being firmly anchored at its lower end and on opposite sides of the side-walls of the aluminum pressure-pot at a material distance below the top thereof.

When the whole assembly is heated, the side-walls of the pressure-pot expand two times the amount the steel clamping-bail will expand in the same corresponding length, and this difference in the thermal enlargement of the two parts, results in added tension in the steel-bail 26 which is balanced by an increase in the pressure between the cover-plate 16 and the upper end of the pressure-pot 11.

This difference in the thermal expansion of aluminum and steel is also made use of in another direction to produce a steam-tight closure of the cover-plate on the pressure-vessel, in that the outside surface of the upper end of the pressure-pot 11 bears directly against the inside surface of the tapered wall 18 of the cover-plate 16 and they are held in firm contact by means of the clamping-bail 26 and under the influence of heat the outside periphery of the aluminum pot expands twice that of the inside periphery or flange of the steel cover-plate, producing a positive pressure between the two interfitted or overlapping surfaces.

The difference in the longitudinal elongation of the pot 11 and bail 26, plus the difference in the circumferential expansion of the pot 11 and the flange of cover 16, produces an effective steam-tight closure of the cover-plate 16 against the upper open end of the pressure-pot 11, as will be readily understood.

It will, therefore be appreciated that this novel and improved pressure-cooker is so constructed that the thermal expansion difference of aluminum and steel is effective in two directions—one longitudinally and one circumferentially.

Either construction alone would produce a steam-tight closure, but the using of one or the other solely would necessitate the employment of greater mechanical pressure in the initial closing of the cooker, whereas a small preliminary mechanical pressure only is needed in the present structure for closing the vessel when the cooker is cold.

The appliance is, in a sense, self-closing or is automatically-sealed against steam-pressure by heat and the difference in the thermal expansion of its parts, namely, aluminum and steel.

The pivot-pins are located on the straight cylindrical side-walls of the pot a substantial vertical distance down from the top of such vessel, or adjacent to the point where the hemispherical bottom wall joins the cylindrical side-walls of the receptacle, this, obviously, being for the purpose of having as great a length as is practical of the side-walls of the pot above the pivot-pins, whereby to increase the total difference in the thermal expansion of the aluminum pot and the same relative length of the steel clamping-bail.

From what precedes it should be clear that the invention as defined by the appended claims, which should be construed as generically as allowable by the state of the prior art, is not limited and restricted to the exact and precise details of construction set forth and that various more or less minor or major modifications may be resorted to without departure from the heart and essence of the invention and without the loss or sacrifice of any of its material advantages.

For example, the two metals aluminum and steel need not be necessarily employed, but other metals may be used which have a material difference in their degrees of expansion under the action of heat.

I claim:

1. In a pressure-cooker, the combination of a rolled sheet-aluminum vessel having a hemispherical bottom and a top mouth provided with a marginal bead, a rolled sheet-steel dished cover for said vessel mouth adapted to bear on said bead and thereby form a transverse joint of the vessel and cover, said cover having a downwardly-extended marginal flange telescoping over the top portion of the vessel thereby forming a circumferential longitudinal overlap-joint of the vessel and cover, hinge-pins on opposite sides of said vessel some distance below the mouth of the vessel, a steel clamping-bail whose middle portion conforms to the outer top surface of said cover and whose legs have gibs and slots receiving said hinge-pins, whereby said clamping-bail may be swung on said hinge-pins into cover-clamping operative position or into an inoperative position releasing said cover, and a steel power-bail hinged on said hinge-pins and adapted to be swung thereon into operative position or into inoperative position, the legs of said power-bail having cams operating on said clamping-bail gibs, whereby after said cover has been placed in position on said vessel said clamping-bail may be swung up over and in engagement therewith, whereupon said power-bail may be rocked on said hinge-pins to cause its cams through coaction with said gibs to tighten the clamping-bail on the cover and the cover on the vessel, the difference in expansion of said vessel both circumferentially and longitudinally from that of said cover and clamping-bail causing a tightening of the joint between the cover and vessel when the cooker is heated.

2. The pressure-cooker set forth in claim 6 in which said vessel is of rolled sheet-aluminum and has a substantially-hemi-spherical bottom and said cover is of rolled sheet-steel and is of dished form.

3. The pressure-cooker set forth in claim 6 in which said cover is of dished form, and in which said clamping-means is shaped in part to conform substantially to the shape of that portion of the cover on which it is adapted to bear.

4. The pressure-cooker set forth in claim 6 in which said clamping-means comprises a hinged clamping-bail adapted to be swung over and to bear upon the cover when the latter is in position closing the mouth of the vessel and a power-bail both hinged to the vessel below its mouth, and coacting means between said bails whereby swinging of said power-bail clamps said clamping-bail more firmly on the cover.

5. The pressure-cooker set forth in claim 6 in which said cover is of dished form, and in which said clamping-means is shaped in part to conform substantially to the shape of that portion of said cover on which it is adapted to bear, said clamping-means comprising a hinged clamping-bail adapted to be swung over and to bear upon the cover when the latter is in position closing the mouth of the vessel and a power-bail both hinged to the vessel below its mouth, and coacting means between said bails whereby swinging of said power-bail clamps said clamping-bail more firmly on the cover.

6. In a pressure-cooker, the combination of a vessel and its cover, said cover and vessel overlapping one another transversely of the height of the vessel and the cover also overlapping the vessel longitudinally of the height of the vessel by extending around the outside of the vessel, and substantially-unyielding clamping-means to hold said cover positively in place on the vessel in pressure-tight relation therewith during the entire cooking operation and releasable manually to permit opening of the vessel and connected to the vessel a substantial distance below said transverse overlapped joint between the vessel and cover, said vessel having a substantially-greater coefficient of heat-expansion than that of said cover and than that of said cover-clamping means, whereby height-elongation and lateral enlargement of said vessel under the action of heat tightens the overlap joints between the vessel and the cover both longitudinally and transversely of the vessel.

7. The pressure-cooker presented in claim 6 in which said vessel is of rolled sheet-aluminum and said cover is of rolled sheet-steel.

8. The pressure-cooker presented in claim 6 in which said clamping-means includes a hinged clamping-bail releasably engaging said cover and a hinged power-bail adapted to exert cover clamping pressure on said clamping-bail.

9. In a pressure-cooker, the combination of a rolled sheet-aluminum vessel having a hemispherical bottom, a rolled sheet-steel inverted-dished-form cover for said vessel, said vessel and cover overlapping one another transversely of the height of the vessel when said cover is in place on, and closing the mouth of, said vessel, and clamping-means for said cover sufficiently unyielding to hold said cover positively in pressure-tight relation on said vessel during the entire cooking operation and releasable manually only to permit opening of the vessel, said clamping-means being connected to said vessel at such a distance below the joint between said vessel and cover that, and said vessel having a coefficient of heat-expansion adequately greater than that of said cover-clamping means that, the height elongation of said vessel under the action of cooking heat tightens the joint between the vessel and its cover.

10. In a pressure-cooker, the combination of a vessel, an inverted-dished-form cover for said vessel, said vessel and cover overlapping one another transversely of the height of the vessel when the cover is in place on, and closing the mouth of, the vessel, and clamping-means for said cover sufficiently unyielding to hold said cover positively in pressure-tight relation on said vessel during the entire cooking operation and releasable manually only to permit opening of the vessel, said clamping-means being shaped in part to conform substantially to the shape of the portion of said cover on which it is adapted to bear, said clamping-means being connected to said vessel at such a distance below the joint between the vessel and cover that, and said vessel having a coefficient of heat expansion adequately greater than that of said cover-clamping means that, the height elongation of said vessel under the action of cooking heat tightens the joint between the vessel and its cover.

11. In a pressure-cooker, the combination of a vessel and its cover, said vessel and cover overlapping one another transversely of the height of the vessel when the cover is in place on, and closing the mouth of, the vessel, and clamping-means for said cover sufficiently unyielding to hold said cover positively in pressure-tight relation on said vessel during the entire cooking operation and releasable manually only to permit opening of the vessel, said clamping-means being connected to said vessel at such a distance below the joint between the vessel and cover that, and said vessel having a coefficient of heat expansion adequately greater than that of said cover-clamping means that, the height elongation of said vessel under the action of cooking heat tightens the joint between the vessel and its cover, said clamping-means comprising a hinged clamping-bail adapted to be swung over and to bear on the cover when the latter is in position closing the mouth of the vessel, and a power-bail, both hinged to the vessel below its mouth, and co-acting means between said bails whereby swinging of said power-bail clamps said clamping-bail more firmly on the cover.

GEORGE G. FLOYD.